United States Patent [19]

Murase et al.

[11] Patent Number: 5,053,166
[45] Date of Patent: Oct. 1, 1991

[54] HETERO-ARYLENE VINYLENE POLYMER AND HIGHLY CONDUCTIVE COMPOSITION THEREOF

[75] Inventors: Ichiki Murase, Ootsu; Toshihiro Ohnishi, Itami; Takanobu Noguchi, Ootsu, all of Japan

[73] Assignee: Director-General of the Agency of Industrial Science & Technology, Japan

[21] Appl. No.: 13,628

[22] Filed: Feb. 11, 1987

[30] Foreign Application Priority Data

| Feb. 18, 1986 | [JP] | Japan | 61-31794 |
| Feb. 18, 1986 | [JP] | Japan | 61-31795 |
| Aug. 26, 1986 | [JP] | Japan | 61-198045 |
| Aug. 26, 1986 | [JP] | Japan | 61-198046 |
| Sep. 18, 1986 | [JP] | Japan | 61-217970 |
| Sep. 18, 1986 | [JP] | Japan | 61-217971 |
| Dec. 25, 1986 | [JP] | Japan | 61-307858 |
| Dec. 25, 1986 | [JP] | Japan | 61-307861 |
| Dec. 25, 1986 | [JP] | Japan | 61-307862 |
| Dec. 25, 1986 | [JP] | Japan | 61-307863 |

[51] Int. Cl.$^5$ .......................... H01B 1/06; H01B 1/00
[52] U.S. Cl. ................................. 252/500; 252/512; 252/518; 252/520; 524/80; 524/401; 524/439
[58] Field of Search ............... 252/500, 512, 518, 519, 252/520; 524/401, 439, 408, 413, 414, 417, 404, 418, 434, 435, 236; 528/481, 396, 502; 526/270

[56] References Cited

U.S. PATENT DOCUMENTS

| 4,528,118 | 7/1985 | Murase et al. | 252/500 |
| 4,808,681 | 2/1989 | Harper et al. | 526/270 |

FOREIGN PATENT DOCUMENTS 0101808 3/1984 European Pat. Off.
0182548 5/1986 European Pat. Off.

OTHER PUBLICATIONS

Makromol. Chem., 182, 3419 (1981).
Makromol. Chem., 131, 15 (1970).

Primary Examiner—Josephine Barr

[57] ABSTRACT

A poly(hetero-arylene vinylene) containing, as its major constituent unit, a repeating unit represented by the general formula

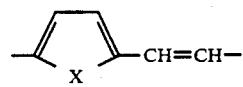

(wherein X is a sulfur or oxygen atom), which is obtained by subjecting a sulfonium salt represented by the general formula

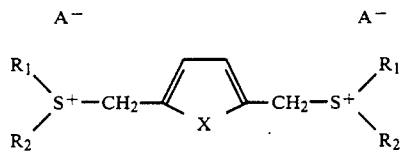

(wherein X has the same definition as given above, $R_1$ and $R_2$ are independently a hydrocarbon group of 1 to 10 carbon atoms, and $A^-$ is a counter ion) to condensation polymerization using an alkali to obtain a precursor polymer, and subjecting the precursor polymer to stretching and orientation and then to a treatment for sulfonium salt elimination or subjecting the precursor polymer in one step to stretching and orientation and to a treatment for sulfonium salt elimination, as well as a highly conductive composition thereof.

6 Claims, No Drawings

HETERO-ARYLENE VINYLENE POLYMER AND HIGHLY CONDUCTIVE COMPOSITION THEREOF

BACKGROUND OF THE INVENTION

1. FIELD OF THE INVENTION

The present invention relates to poly(hetero-arylene vinylene)s having a high conductivity, as well as to highly conductive compositions comprising said polymer and a dopant. These compositions are useful as a conductive polymer material.

2. DESCRIPTION OF THE PRIOR ART

Of the poly(hetero-arylene vinylene)s of the present invention, a poly(2,5-thienylene vinylene) is already popular as a straight chain conjugated polymer. It is known that this poly(2,5-thienylene vinylene) can be synthesized according to, for example, the Wittig reaction wherein a diphosphonium salt and a dialdehyde are reacted [Macromol. Chem., 182, 3419 (1981); Macromol. Chem., 131, 15 (1970)]. It is further known that the polymer, when measured for its conductivity, is an insulator or semiconductor of at best $10^{-8}$ S/cm or below.

A poly(2,5-furandiyl vinylene) is also popular as a straight chain conjugated polymer. It is known that this polymer can be synthesized according to, for example, a self-condensation reaction of 5-methylfuran-2-carboaldehyde using a base as a catalyst [Macromol. Chem., 182, 3419 (1981)].

Conductive compositions comprising one of the above polymers in powder form and an electron acceptor or donor as a dopant are proposed in European Patent Application (Laid-Open) No. 0101808.

The conventionally known poly(hetero-arylene vinylene)s mentioned above are produced in a powder form; these polymers except those of low polymerization degree are insoluble and infusible; accordingly, it is virtually impossible to process them into a film or fiber and no useful molded article has been obtained from them even by using a special powder molding method. The conductive compositions mentioned above have a low conductivity of $10^{-3}$ S/cm or below making them insufficient for practical application. Moreover, these compositions have a powder form.

SUMMARY OF THE INVENTION

The present inventors made an extensive research in order to obtain a poly(hetero-arylene vinylene) having a high conductivity. As a result, it has been found that stretched poly(hetero-arylene vinylene) molded articles produced via a precursor polymer provide a highly conductive composition and that a poly(2,5-thienylene vinylene) produced by eliminating, from a precursor polymer having an alkoxy group as a side chain, its alkoxy group has a higher conductivity than conventionally produced poly (2,5-thienylene vinylene)s.

An object of the present invention is to provide (a) a stretched poly(hereto-arylene vinylene) containing, as a major constituent unit, a repeating unit represented by the general formula (II)

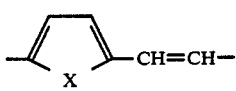

(wherein X is a sulfur or oxygen atom) which is produced by subjecting a sulfonium salt represented by the general formula (I)

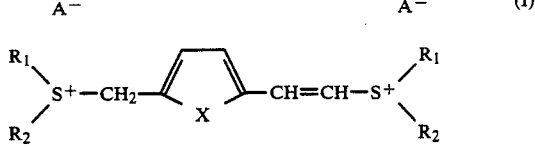

(wherein X has the same definition as given above, $R_1$ and $R_2$ are independently a hydrocarbon group of 1 to 10 carbon atoms, and $A^-$ is a counter ion) to condensation polymerization using an alkali to obtain a precursor polymer, and subjecting the precursor polymer to stretching and orientation and then to a treatment for sulfonium salt elimination or subjecting the precursor polymer in one step to stretching and orientation and to a treatment for sulfonium salt elimination, and (b) a highly conductive composition comprising, as essential components, said stretched polymer (a) and a dopant.

Another object of the present invention is to provide (a) a precursor polymer consisting essentially of a repeating unit represented by the general formula (III)

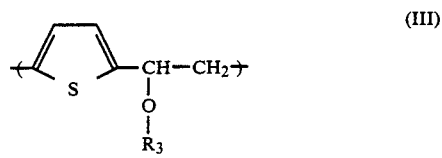

(wherein $R_3$ is a hydrocarbon group of 1 to 10 carbon atoms), (b) a poly(2,5-thienylene vinylene) obtained by eliminating, from said precursor polymer (a), its $-OR_3$ groups and (c) a highly conductive composition comprising, as essential components, said polymer (b) and a dopant.

Other objects will become apparent from the following descrption of the specification.

DETAILED DESCRIPTION OF THE INVENTION

The present invention will be described in detail below.

The starting monomer used in the reaction scheme of the present invention is a 2,5-thienylene dimethylene bis-sulfonium salt or a 2,5-furandiyl dimethylene bissulfonium salt, both represented by the general formula (I). In the general formula (I), $R_1$ and $R_2$ are independently a hydrocarbon group of 1 to 10 carbon atoms such as methyl, ethyl, propyl, isopropyl, n-butyl, 2-ethylhexyl, phenyl, cyclohexyl, benzyl or the like. Of these, hydrocarbon groups of 1 to 6 carbon atoms, particularly methyl and ethyl groups are preferred.

As the counter ion $A^-$ of the sulfonium salt, there can be used any counter ion according to an ordinary method. For example, there can be used halogen, hydroxide, boron tetrafluoride, perchloric acid, carboxylic acid and sulfonic acid ions. Of these, halogen (e.g. chlorine, bromine, iodine) and hydroxide ions are preferred.

The precursor polymer can be obtained by subjecting a 2,5-thienylene dimethylene bis-sulfonium salt or a 2,5-furandiyl dimethylene bis-sulfonium salt to condensation polymerization using an alkali in a solvent.

As the solvent used in the condensation polymerization, there can be used water, an alcohol and a mixed solvent containing water and/or an alcohol. Of these, a water-containing solvent is preferred because it can increase the solubility of the alkali therein.

The alkali solution used in the condensation polymerization is preferred to be a strongly basic solution of pH 11 or higher. As the alkali, there can be used sodium hydroxide, potassium hydroxide, calcium hydroxide, a quaternary ammonium hydroxide, a sulfonium hydroxide, a strongly basic ion exchange resin of OH type, etc. Of these, sodium hydroxide, potassium hydroxide and the strongly basic ion exchange resin are preferred.

The temperature of the condensation polymerization reaction is preferred to be relatively low, i.e. 25° C. or below, particularly 5° C. or below, more particularly −10° C. or below because the sulfonium salt group is sensitive to heat, visible light, ultraviolet rays, strong bases and tends to cause, after polymerization, slow separation from the formed polymer due to these factors. The time of the reaction has no particular restriction and can be selected appropriately depending upon the reaction temperature employed. However, it is usually between 1 minute and 50 hours.

In the present invention, the sulfonium salt polymer thus obtained as a precursor is finally converted to a poly(hetero-arylene vinylene). In one embodiment for producing a poly(2,5-thienylene vinylene), the sulfonium salt polymer obtained above, namely, the precursor polymer is once subjected to a substitution reaction of an alkoxy group for the sulfonium salt group to obtain a polymer having an alkoxy group as a side chain, consisting essentially of a repeating unit represented by the general formula (III), and the polymer is then converted to a poly(2,5-thienylene vinylene).

In the above embodiment, a precursor polymer for poly(2,5-thienylene vinylene) is formed as a high-molecular electrolyte (a sulfonium salt polymer) having a sulfonium salt

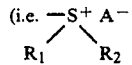

(i.e. $-S^+ A^-$ / \ $R_1$ $R_2$)

as its side chain; then, the precursor polymer is reacted with an alcohol ($R_3OH$) used as a component of a solvent used, to substitute an alkoxy group ($R_3O-$) [this corresponds to the $-OR_3$ group of the formula (III)] for the sulfonium salt side chain.

Hence, it is requisite that the solvent used in the above reaction contains an alcohol represented by $R_3OH$. This alcohol can be used singly or as a mixture with other solvent. The other solvent has no particular restriction as long as it is soluble in the alcohol; however, water is particularly preferred. The other solvent content in the mixed solvent has no particular restriction, either, as long as the mixed solvent contains the alcohol; but the content is preferably at least 5% by weight.

As the $R_3$, there can be mentioned hydrocarbon groups of 1 to 10 carbon atoms such as methyl, ethyl, propyl, isopropyl, n-butyl, 2-ethylhexyl, phenyl, cyclohexyl and the like. Of these, hydrocarbon groups of 1 to 6 carbon atoms, particularly methyl and ethyl groups are preferred.

The substitution reaction of alkoxy group for sulfonium salt side chain becomes more effective by conducting it at a temperature higher than the one used in the formation of the precursor polymer.

When the solvent used in the formation of the precursor polymer contains an alcohol necessary for the substitution reaction of alkoxy group for sulfonium salt side chain, the substitution reaction can be conducted subsequently to the formation of the precursor polymer. Meanwhile, when the solvent is, for example, water and contains no alcohol, an alcohol must be added to initiate the substitution reaction.

The temperature used in the substitution reaction is preferably 0° to 50° C., more preferably 0° to 25° C. in view of the reaction speed. In general, polymers having an alkoxy group as the side chain are insoluble in the mixed solvent used in their formation and accordingly precipitate with the progress of the polymerization reaction. Hence, it is effective to conduct the reaction until the precipitation of formed polymer is completed; therefore, the reaction time is, for example, preferably at least 15 minutes, more preferably at least one hour.

The precursor polymer having an alkoxy group as its side chain can be separated by filtering the precipitate formed above.

The precursor polymer for poly(hetero-arylene vinylene), in order to allow it to have a high conductivity, is desired to have a sufficiently large molecular weight. Therefore, a precursor polymer having a structure of at least two repeating units, preferably 5 to 50,000 repeating units, for example, a precursor polymer having such a large molecular weight as the polymer can not be dialyzed through a dialysis membrane having a molecular cut off level of 3,500 are effectively used.

The precursor polymer having an alkoxy group as its side chain is insoluble in water but soluble in organic solvents such as dimethylformamide, dimethylacetamide, dimethyl sulfoxide, dioxane, chloroform and the like; therefore, it can be made into a molded article of any desired shape from its solution in such an organic solvent. Further, a poly(2,5-thienylene vinylene) obtained by elimination of alkoxy group from the precursor polymer can give, by doping it, a more conductive composition than a poly(2,5-thienylene vinylene) obtained by elimination of sulfonium salt from a precursor polymer having a sulfonium salt as its side chain. Any desired method can be used in producing a precursor polymer molded article. The molded article can have any desired shape such as a film, a fiber, a coated membrane or the like. A particularly useful method for producing a precursor polymer molded article is one using a precursor polymer solution, wherein the solution is casted to obtain a film or subjected to solution spinning to obtain a fiber or coated onto a substrate to obtain a coated membrane. The precursor polymer having a sulfonium salt as its side chain is soluble in water and aqueous alcohols and, similarly to the precursor polymer having an alkoxy group as its side chain, can be made into a molded article of any desired shape from its solution in water or in an aqueous alcohol. Such a precursor polymer solution used in production of a precursor polymer molded article is preferred to be subjected to a preliminary treatment such as dialysis, precipitation or the like and, as a result, to contain no low-molecular polymer or no unreacted raw material.

The precursor polymer of the present invention is subjected to a treatment for elimination of its sulfonium salt or alkoxy group to obtain a poly(hetero-arylene vinylene). This elimination treatment can be effected using a means such as heat, visible light, ultraviolet rays or the like. An elimination treatment by heat is preferred. It is also preferred that the elimination treatment for the precursor polymer be effected in an inert atmosphere. The inert atmosphere refers herein to an inert gas such as nitrogen, argon, helium or the like. The elimination treatment may also be effected under vacuum or in an inert medium.

In the elimination treatment by heat, the appropriate treatment temperature is ordinarily 0° to 400° C., preferably 50° to 350° C., more preferably 100° to 320° C., because the treatment at too high a temperature causes the decomposition of the poly(hetero-arylene vinylene) formed and the treatment at too low a temperature makes the elimination reaction slow and impractical. The treatment time can be determined appropriately depending upon the treatment temperature used, but 1 minute to 10 hours is practical for industrial use.

The thus produced poly(hetero-arylene vinylene) contains a hetero-arylene vinylene repeating unit as its major constituent unit. According to the production process of the present invention, it is possible to produce a poly(hetero-arylene vinylene) containing only a conjugated hetero-arylene vinylene repeating unit, but it is also possible to produce a poly(hetero-arylene vinylene) containing, in addition to said repeating unit, a minor amount of a non-conjugated 2,5-hetero-arylene ethylene unit. Examination by infrared absorption spectrum or the like reveals that the poly(hetero-arylene vinylene) obtained from an insufficient elimination treatment contains, besides a 2,5-hetero-arylene vinylene unit, a 2,5-hetero-arylene ethylene unit formed as a result of incomplete elimination. Such a poly(hetero-arylene vinylene) has high flexibility. The proportion of 2,5-hetero-arylene ethylene unit to 2,5-hetero-arylene vinylene unit can be varied so as to best meet the application purpose of poly(hetero-arylene vinylene), by appropriately selecting the production conditions of the polymer.

The poly(hetero-arylene vinylene) which is used for the production of a highly conductive composition of the present invention is not required to contain only a conjugated hetero-arylene vinylene repeating unit. The present inventors unexpectedly have found a fact that even a poly(hetero-arylene vinylene) containing, besides a 2,5-hetero-arylene vinylene unit, a 2,5-hetero-arylene ethylene unit formed as a result of incomplete elimination can be endowed with a high conductivity by doping. Such a poly(hetero-arylene vinylene) has an advantage of being capable of providing a conductive composition of high flexibility.

In order to obtain a highly conductive composition of the present invention, the proportion of 2,5-hetero-arylene ethylene unit in poly(hetero-arylene vinylene) is preferably 1 or below, more preferably 1/20 or below per 1 unit of 2,5-hetero-arylene vinylene.

It is also possible that the precursor polymer molded article is subjected to stretching and orientation and to an elimination treatment by heat. This stretching and orientation treatment can be effected before or simultaneously with the elimination treatment of sulfonium salt or alkoxy group.

Orientation can be effected by employing an appropriate molding method. It can be achieved even by extrusion under a high shearing force, but a high orientation can be obtained by subjecting a precursor polymer molded article produced from a precursor polymer solution to stretching under heating. The degree of stretching and orientation obtained can be ascertained by the appearance of infrared dichromism in polarization infrared spectrum. In this way, a poly(hetero-arylene vinylene) stretched to at least two times can be obtained. Stretching and orientation is a very effective procedure to obtain a poly(hetero-arylene vinylene) of high conductivity. The stretch ratio of poly(hetero-arylene vinylene) is preferred to be at least two times.

The poly(hetero-arylene vinylene) molded article obtained from the elimination treatment of a precursor polymer is then doped with an electron acceptor or donor (hereinafter referred to as a dopant), whereby a highly conductive composition can be produced.

Particularly, the poly(hereto-arylene vinylene) molded article subjected to stretching and orientation and the poly(2,5-thienylene vinylene) obtained from the elimination of alkoxy group can produce a composition of higher conductivity than conventionally produced poly(2,5-thienylene vinylene)s.

As the dopant, there may be effectively used those compounds which have been found to be effective in improving the conductivity in doping a prior electroconductive polymer such as polyacetylene and in forming an intercalated compound of graphite.

The composition of the present invention can be produced using any doping method. However, doping methods such as chemical doping, electrochemical doping, photo-doping, ion implantation and the like are preferred.

Specific examples of the electron acceptor include the followings.

Halogen compounds: Fluorine, chlorine, bromine, iodine, iodine chloride, iodine trichloride, iodine bromide.

Lewis acids: Phosphorus pentafluoride, arsenic pentafluoride, antimony pentafluoride, boron trichloride, boron trichloride, boron tribromide, sulfur trioxide Proton acids: Hydrogen fluoride, hydrogen chloride, nitric acid, sulfuric acid, perchloric acid, fluorosulfonic acids, chlorosulfonic acids, trifluoromethanesulfonic acid.

Transition metal chlorides: Titanium tetrachloride, zirconium tetrachloride, hafnium tetrachloride, niobium pentachloride, tantalum pentachloride, molybdenum. pentachloride, tungsten hexachloride, iron trichloride.

Organic compounds: Tetracyanoethylene, tetracyanoquinodimethane, chloranil, dichlorodicyanobenzoquinone.

Specific examples of the electron donor include the following.

Alkali metals: Lithium, sodium potassium, rubidium, cesium.

Quarternary ammonium salts: Tetraalkylammonium ion.

The content of dopant in the composition of the present invention is determined by the type of dopant used. However, it can generally be altered as desired, depending upon the doping conditions (e.g. doping time, dopant concentration). A preferable content of dopant is ordinarily 0.01 to 2.0 moles per one repeating unit of poly(hetero-arylene vinylene). When the mole number is too small, the high conductivity of composition is not attained. When the mole number is too large, the conductivity of composition tends to saturate and accordingly too large a previously, those which do not interfere with the conjugated double bonds, thienylene ring and furandily ring of poly(hereto-arylene vinylene) are preferred because they can provide a highly conductive composition. Sulfur trioxide and iodine are particularly effective dopants.

The composition of the present invention can have a conductivity of $10^{-2}$ to 100 S/cm or higher even when it is a non-oriented molded article. The composition can have a conductivity of 150 S/cm or higher particularly when it contains iodine as a dopant of weak oxidation power. The composition, when it is a highly oriented molded article, can have a conductivity of 200 S/cm or higher, or even as high as 500 S/cm in some cases. The monoaxially stretched composition of such a high conductivity shows an electrical anisotropy and the anisotropy between the direction of stretching and the direction perpendicular thereto can reach at least five times.

In order to obtain a composition of high conductivity, it is highly preferred that both the elimination treatment of precursor polymer and the doping of poly(hetero-arylene vinylene) be effected in an inert atmosphere. The use of an oriented poly(2,5-thienylene vinylene) or an oriented poly(2,5-furandiyl vinylene) is also preferred.

As appreciated from the foregoing, a highly conductive composition of desired shape comprising a poly(hereto-arylene vinylene) and a dopant can be provided according to the present invention. The composition can have a far higher conductivity when comprising a poly(hereto-arylene vinylene) produced from a novel precursor polymer having an alkoxy side chain than when comprising a conventionally produced poly(2,5-thienylene vinylene). Thus, a poly(hetero-arylene vinylene) composition of desired shape which finds applications as an electric or electronic material can be provided.

The present invention will be described in more detail below by way of Examples and Comparative Examples. However, the present invention is in no way restricted by them.

COMPARATIVE EXAMPLE 1

3.9 g of 2,5-thienylene bis(methylenedimethylsulfonium bromide) was dissolved in 50 ml of a 1 : 1 (by volume) mixed solvent consisting of deionized water and methanol. Thereto was dropwise added 50 ml of a 1 : 4 (by volume) mixed solvent consisting of deionized water and methanol, containing 0.4 g of sodium hydroxide, at $-30°$ C. for 30 minutes. After the completion of the dropwise addition, stirring was continued for 30 minutes at $-30°$ C. to effect a reaction. After the reaction, the reaction mixture was neutralized with a 0.77 N aqueous hydrogen bromide solution.

The resulting mixture was then dialyzed against a 1 : 1 (by volume) mixed solvent consisting of water and methanol, at $-30°$ C. for 1 day using a dialysis membrane of 8,000 molecular weight fractionation (Cellotube ®, manufactured by Union Carbide Co.). The dialyzate was concentrated under vacuum to precipitate a polymer (a sulfonium salt polymer). The polymer precipitated was separated by solid-liquid separation. The polymer was measured for $H^1$-NMR spectrum using deuterated dimethyl sulfoxide as a solvent. The spectrum varied largely with time. In the spectrum of early stage, proton was seen around 6.7 ppm, 4.5 ppm and 3.2 ppm at proportions of 2 : 1 : 8, respectively, which confirmed the structure of sulfonium salt polymer.

The polymer was dissolved in tetrahydrofuran at room temperature, casted and dried at room temperature in nitrogen stream to obtain an yellow polymer intermediate film of 10 μm in thickness.

This film (length: 5 cm, width: 3 cm) was placed in a horizontal tubular furnace and statically heated at 250° C. for 30 minutes in a nitrogen atmosphere, to obtain a poly(2,5-thienylene vinylene) film having a metallic gloss.

The chemical structure of this product was identified from the fact that its elementary analysis gave the following result

|  | C | H | S |
|---|---|---|---|
| Found (%) | 65.3 | 3.8 | 31.9 |
| Calculated (%) | 66.6 | 3.7 | 29.6 | and also from the fact that its characteristic absorption in IR absorption spectrum is identical with that of a standard product obtain from the Wittig reaction. The above film was doped with iodine (an electron acceptor) of gas state at room temperature according to an ordinary method, whereby the film showed a conductivity of 151 S/cm in 6 hours. Incidentally, the determination of conductivity was conducted by a four-probe method.

COMPARATIVE EXAMPLE 2

The poly(2,5-thienylene vinylene) film obtained in Comparative Example 1 was subjected to electrolytic doping using a 0.5 N $LiClO_4$ —propylene carbonate solution as an electrolyte. The resulting film was of black color with a gloss and had a conductivity of 73 S/cm.

COMPARATIVE EXAMPLE 3

The poly(2,5-thienylene vinylene) film obtained in Comparative Example 1 was doped with sulfur trioxide emitted from 30% fuming sulfuric acid. The resulting film had a conductivity of 33 S/cm.

EXAMPLE 1

The polymer obtained in Comparative Example 1 as a precipitate is a precursor polymer for poly(2,5-thienylene vinylene). It was immediately dissolved in tetrahydrofuran. The resulting solution was casted on a polyethylene film. The film was dried in a nitrogen stream to obtain a cast film.

This cast film was stretched to three times from room temperature to 100° C. and then heat-treated at 100° C. for 2 hours to obtain a stretch poly(2,5-thienylene vinylene) film having the same chemical structure as the of Comparative Example 1. This film showed infrared dichromism, which confirmed that the film was oriented. The film, when subjected to iodine doping, showed a high conductivity of 553 S/cm. Further, the anisotropy of conductivity was measured according to the Montgomery method, which showed an anisotropy of 7 or larger. Thus, the conductivity increased in the direction of stretching.

EXAMPLE 2

4.3 g of 2,5-thienylene-bis(methylenedimehtylsulfonium bromide) was dissolved in 50 ml of a mixed solvent consisting of 1 : 1 (by volume) deionized water and methanol. The resulting solution was cooled to $-30°$ C. Thereto was slowly added in 10 minutes a strongly basic ion exchange resin of OH type (Amberlite ® IRA-401, manufactured by Rohm and Haas Co.) of an amount of two times to the sulfonium salt. After the addition, stirring was continued for 50 minutes at −30° C. to effect a reaction.

The reaction mixtures was filtered. The titrate was dialyzed against a 1 : 4 (by volume) water-methanol mixed solvent, for 1 day at −30° C. using a dialysis membrane of 3,500 molecular weight fractionation (Cellotube ®, manufactured by Union Carbide Co.). The resulting dialyzate was casted and dried for 24 hours at 30° C. under vacuum.

The resulting sulfonium salt polymer film was subjected to heating and stretching up to 200° C. in a nitrogen stream to obtain a poly(2,5-thienylene vinylene) film stretched to two times.

This film was then doped with iodine according to an ordinary method. The doped film was measured for conductivity, which was 287 S/cm.

EXAMPLE 3

The sulfonium salt polymer film obtained in Example 2 was subjected to heating and stretching up to 200° C. to obtain a poly(2,5-thienylene vinylene) film stretched to four times. This film showed infrared dichroism when measured for polarization infrared adsorption spectrum, which indicated that the film was oriented.

EXAMPLE 4

7.8 g of 2,5-thienylene-bis(methylenedimethylsulfonium bromide) was dissolved in 200 ml of a 1 : 1 (by volume) mixed solvent consisting of deionized water and methanol. Thereto was added dropwise a mixed solution consisting of 20 ml of a 1 N NaOH solution and 80 ml of methanol, at −30° C. in 30 minutes. After the addition, stirring was continued for 30 minutes at −30° C. to effect a reaction. The reaction mixture was quickly placed in a dialysis membrane of 8,000 molecular weight fractionation (Cellotube ®, manufactured by Union Carbide Co.) and immersed in a 1 : 1 water-methanol mixed solvent cooled to 0° C. for 1 day to effect dialysis, whereby an yellow precipitate appeared in the dialysis membrane. This precipitate was dissolved in dimethylacetamide, casted and dried in a nitrogen stream to obtain a precursor film.

This film was subjected to elementary analysis. The result was as follows.

|  | C | H | S | Br |
| --- | --- | --- | --- | --- |
| Found (%) | 59.4 | 5.9 | 22.2 | <1 |
| Calculated I (%) | 60.0 | 5.7 | 22.9 | 0 |
| Calculated II (%) | 38.2 | 4.4 | 25.5 | 31.8 |

Calculated I shows a case where the precursor has a methoxy side chain, the Calculated II shows a case where the precursor has a sulfonium salt side chain.

Further, the precursor film was dissolved in deuterated dimethyl sulfoxide and measured for $^{13}$C-NMR. In $^{13}$C-NMR, signals were observed at 38 ppm, 56 ppm, 79 ppm, 125 ppm, 140 ppm and 142 ppm. In IR absorption spectrum, an absorption due to ether linkage was seen at 1,100 cm$^{-1}$. These analytical results confirmed that the precursor polymer had a methoxy group as its side chain.

Also, the precursor film was measured for degree of polymerization by means of gel permeation chromatography using dimethylformamide as a solvent. The precursor had a polymerization degree of 1,200 as calculated from the number average molecular weight of polystyrene.

The precursor film (length: 2 cm, width: 1 cm) was placed in a horizontal tubular furnace and statically heated at 100° C. for 30 minutes in a nitrogen atmosphere to obtain a black poly(2,5-thienylene vinylene) film having a golden gloss. The chemical structure of this product was confirmed from its elementary analysis and also from the fact that its characteristic absorption in infrared absorption spectrum was identical with that of a standard product obtained from the Wittig reaction.

The gas generated during the above heating of the precursor film in the furnace was analyzed using a quadrupole mass spectrometer, which gave only a signal of mass number 32 probably issued by methyl alcohol.

The poly(2,5-thienylene vinylene) film was doped with iodine (an electron acceptor) of gas phase for 6 hours at room temperature according to an ordinary method to obtain a composition. This composition was measured for conductivity in accordance with the four-probe method, which gave 374 S/cm.

EXAMPLE 5

The poly(2,5-thienylene vinylene) film obtained in Example 4 was doped with sulfur trioxide emitted from 30% fuming sulfuric acid. The resulting composition had a conductivity of 124 S/cm.

EXAMPLE 6

The poly(2,5-thienylene vinylene) film obtained in Example 4 was subjected to electrolytic doping using a 0.5 N LiClO$_4$-acetonitrile solution as an electrolyte. The resulting film was of black color with a gloss and had a conductivity of 151 S/cm.

EXAMPLE 7

The precursor polymer for poly(2,5-thienylene vinylene), obtained in Example 4 was dissolved in dimethylacetamide. The solution was casted on a polyethylene film and dried in a nitrogen stream to obtain a cast film.

This cast film was stretched up to six times at 80° C. or above and then heated at 200° C. for 1 hour under load to obtain a stretched poly(2,5-thienylene vinylene) film. This film showed infrared dichroism, which indicated that the film was orientated.

The film was doped with iodine and then measured for conductivity, which showed a very high conductivity of 2,110 S/cm. The anisotropy of conductivity was measured according to the Montgomery method, which gave an anisotropy of 30 or above. Thus, the conductivity increased in the direction of stretching.

EXAMPLE 8

4.3 g of 2,5-thienylene-bis(methylenedimethylsulfonium bromide) was dissolved in 50 ml of a 1 : 1 (by volume) deionized water-ethanol mixed solvent. The resulting solution was cooled to −30° C. Thereto was slowly added in 10 minutes a strongly basic ion exchange resin of OH type (Amberlie ® IRA-401, manufactured by Rohm and Haas Co.) of an amount of two times the sulfonium salt. After the addition, stirring was conducted for 50 minutes at −30° C. to effect a reaction.

After the reaction, the reaction mixture was separated from the ion exchange resin and filtered. The filtrate was heated to 0° C. and then allowed to stand for 10 hours at the temperature, whereby an yellow precipitate appeared. This precipitate was dissolved in dimethylacetamide and then reprecipitated from water. The precipitate obtained was dissolved in dimethylacetamide and the solution was made into a cast film. This precursor film was measured for $H^1$-NMR spectrum using deuterated dimethyl sulfoxide as a solvent, in which the proton signal of the methyl of ethoxy group was seen at 1.1 ppm.

The precursor film was further measured for degree of polymerization by means of gel permeation chromatography using dimethylformamide as a solvent. The polymerization degree was 800 as calculated from the number average molecular weight of polystyrene.

The precursor film was heated up to 200° C., and stretched in a nitrogen stream to obtain a poly(2,5-thienylene vinylene) film stretched to five times. This film was measured for infrared absorption spectrum, in which the characteristic absorption was identical with that of the product obtained in Example 4. The film further showed infrared dichroism, which indicated that the film was oriented.

The film was doped with iodine and then measured for conductivity. The doped film had a conductivity of 1,294 S/cm.

COMPARATIVE EXAMPLE 4

7.6 g of 2,5-furandiyl-bis(methylenedimethylsulfonium bromide) was dissolved in 200 ml of a 1 : 1 (by volume) mixed solvent consisting of deionized water and methanol. Thereto was added dropwise a mixed solvent consisting of 20 ml of a 1 N NaOH solution and 80 ml of methanol, at −30° C. in 30 minutes. After the addition, stirring was continued for 30 minutes at −30° C. to effect a reaction.

The reaction mixture was dialyzed against a 1 : 1 (by volume) water-methanol mixed solvent for 1 day at −30° C. using a dialysis membrane of 8,000 molecular weight fractionation (Cellotube ®, manufactured by Union Carbide Co.).

The dialyzate was casted and dried under vacuum to obtain a black polymer intermediate film of 10 μm in thickness.

This film (length: 2 cm, width; 1 cm) was placed in a horizontal tubular furnace and statistically heated at 100° C. for 30 minutes in a nitrogen atmosphere to obtain a black poly(2,5-furandiyl vinylene) film.

The chemical structure of this product was identified from the fact that its elementary analysis gave the following result

|  | Atomic ratio | |
|---|---|---|
|  | H/C | O/C |
| Found | 0.72 | 0.19 |
| Calculated | 0.67 | 0.17 | and also from the fact that its infrared absorption spectrum showed a characteristic absorption of trans-vinylene at 940 cm$^{-1}$.

The poly(2,5-furandiyl vinylene) film was doped with iodine (an electron acceptor) of gas state at room temperature according to an ordinary method. After 6 hours of doping, the film showed a conductivity of $1.3 \times 10^{-2}$ S/cm. The conductivity was measured in accordance with the four-probe method.

EXAMPLE 9

4.3 g of 2,5-furandiyl-bis(methylenedimethylsulfonium bromide) was dissolved in 50 ml of a 1 : 1 (by volume) deionized water-methanol mixed solvent. The resulting solution was cooled to 0° C. Thereto was slowly added in 10 minutes a strongly basic ion exchange resin of OH type (Amberlite ® IRA-401, manufactured by Rohm and Haas Co.) of an amount of two times the sulfonium salt. After the addition, stirring was continued for 50 minutes at 0° C. to effect a reaction.

After the reaction, the reaction mixture was filtered. The filtrate was dialyzed against a 1 : 1 (by volume) water-methanol mixed solvent at 0° C. for 1 day using a dialysis membrane of 3,500 molecular weight fractionation (Cellotube ®, manufactured by Union Carbide Co.). The dialyzate was casted and dried for 24 hours at 30° C. under vacuum to obtain a polymer intermediate film.

This polymer intermediate film was heated up to 250° C. and stretched in a nitrogen stream to obtain a poly(2,5-furandiyl vinylene) film stretched to two times. This polymer had the same chemical structure as that of the polymer of Comparative Example 4.

The stretched polymer film was doped with iodine according to an ordinary method and then measured for conductivity, which was $2.2 \times 10^{-2}$ S/cm.

EXAMPLE 10

4.3 g of 2,5-furandiyl-bis(methylenedimethylsulfonium bromide) was dissolved in 50 ml of a 1 : 1 (by volume) deionized water-methanol mixed solvent. The resulting solution was cooled to −30° C. Thereto was slowly added in 10 minutes a strongly basic ion exchange resin of OH type (Amberlite ® IRA-401, manufactured by Rohm and Haas Co.) of an amount of two times to the sulfonium salt. After the addition, stirring was continued for 50 minutes at −30° C. to effect a reaction.

After the reaction, the reaction mixture was filtered. The filtrate was dialyzed against a 1 : 4 (by volume) water-methanol mixed solvent at −30° C. for 1 day using a dialysis membrane of 3,500 molecular weight fractionation (Cellotube ®, manufactured by Union Carbide Co.). The dialyzate was casted and dried at 30° C. for 24 hours under vacuum to obtain a sulfonium salt polymer film.

This film was heated up to 200° C and stretched in a nitrogen stream to obtain a poly(2,5-furandiyl vinylene) film stretched to two times. This stretched film showed the same characteristic absorption in infrared absorption spectrum as that of the poly(2,5-furandiyl vinylene) film of Comparative Example 4. The stretched film also showed infrared dichroism, which indicated that the film was oriented.

What is claimed is:

1. A highly conductive composition comprising, as essential components, a stretched poly(hetero-arylene vinylene) molded article and a dopant, the stretched poly(hetero-arylene vinylene)molded article containing, as its major constituent unit, a repeating unit represented by the general formula:

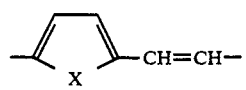

(wherein X is a sulfur and being obtained by subjecting a sulfonium salt represented by the general formula:

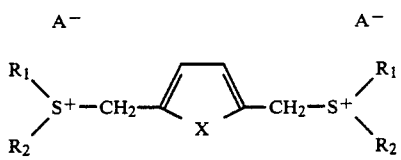

(wherein X has the same definition as given above, $R_1$ and $R_2$ are independently a hydrocarbon group of 1 to 10 carbon atoms, and $A^-$ is a counter ion) to condensation polymerization using an alkali to obtain a precursor polymer, and subjecting the precursor polymer to stretching and orientation and then to a treatment for sulfonium salt elimination or subjecting the precursor polymer in one step to stretching and orientation and to a treatment for sulfonium salt elimination, wherein the stretch ratio is at least two times.

2. A highly conductive composition according to claim 1, wherein the stretched poly(hetero-arylene vinylene) molded article is film, a fiber, a foamed article or a coated membrane.

3. A highly conductive composition comprising, as essential components, a poly(2,5-thienylene vinylene) and a dopant, the poly(2,5-thienylene vinylene) being obtained by eliminating, from a precursor polymer consisting essentially of a repeating unit represented by the general formula

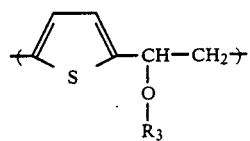

(wherein $R_3$ is a hydrocarbon group of 1 to 10 carbon atoms), its alkoxy group.

4. A highly conductive composition comprising, as essential components, a poly(2,5-thienylene vinylene) containing;

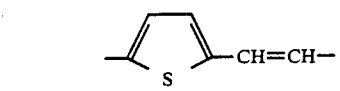

as a major repeating unit and a dopant, the poly(2,5-thienylene vinylene) being obtained by polymerizing a sulfonium salt monomer represented by the general formula

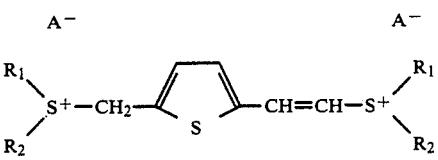

(wherein $R_1$ and $R_2$ are independently a hydrocarbon group of 1 to 10 carbon atoms and $A^-$ is a counter ion) using an alkali in a solvent, reacting the resulting polymer with an alcohol to obtain a precursor polymer having an alkoxy group as a side chain, represented by the general formula

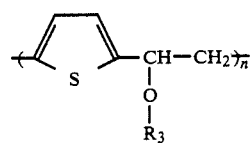

(wherein $R_3$ is a hydrocarbon group or 1 to 10 carbon atoms and n is an integer of 2 or above), and eliminating, from the precursor polymer, its alkoxy group.

5. A highly conductive composition according to claim 3, wherein the poly(2,5-thienylene vinylene) is a stretched molded article.

6. A highly conductive composition according to claim 4, wherein the poly(2,5-thienylene vinylene) is a stretched molded article.

* * * * *